(12) United States Patent
Weaver et al.

(10) Patent No.: US 10,594,808 B2
(45) Date of Patent: Mar. 17, 2020

(54) PRE-FETCHING NEWSFEED STORIES FROM A SOCIAL NETWORKING SYSTEM FOR PRESENTATION TO A USER

(71) Applicant: Facebook, Inc., Menlo Park, CA (US)

(72) Inventors: Daniel Weaver, Redwood City, CA (US); Kang Zhang, Mountain View, CA (US); Lars Seren Backstrom, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1171 days.

(21) Appl. No.: 13/869,014

(22) Filed: Apr. 23, 2013

(65) Prior Publication Data

US 2014/0317184 A1 Oct. 23, 2014

(51) Int. Cl.
G06Q 10/10 (2012.01)
G06Q 50/00 (2012.01)
H04L 29/08 (2006.01)

(52) U.S. Cl.
CPC .......... H04L 67/22 (2013.01); G06Q 10/10 (2013.01); G06Q 50/01 (2013.01)

(58) Field of Classification Search
CPC .................................................. H04L 67/22
USPC ......................................................... 709/204
See application file for complete search history.

(56) References Cited

U.S. PATENT DOCUMENTS

| 7,805,495 | B2 * | 9/2010 | Marmaros | G06F 17/30884 |
| | | | | 709/217 |
| 8,495,143 | B2 | 7/2013 | Zhou et al. | |
| 8,938,500 | B1 * | 1/2015 | Acharya | G06Q 50/01 |
| | | | | 705/319 |
| 2010/0100607 | A1 * | 4/2010 | Scholz | G06F 17/30702 |
| | | | | 709/219 |
| 2011/0107374 | A1 * | 5/2011 | Roberts | H04N 5/44543 |
| | | | | 725/46 |
| 2011/0125765 | A1 * | 5/2011 | Tuli | G06F 17/30035 |
| | | | | 707/751 |
| 2011/0283185 | A1 * | 11/2011 | Obasanjo | G06F 17/3089 |
| | | | | 715/243 |
| 2012/0151313 | A1 * | 6/2012 | Tsirkin | G06F 17/30893 |
| | | | | 715/206 |
| 2012/0166532 | A1 | 6/2012 | Juan et al. | |
| 2012/0204096 | A1 * | 8/2012 | Kendall | G06Q 30/02 |
| | | | | 715/234 |
| 2013/0031034 | A1 | 1/2013 | Gubin et al. | |

(Continued)

Primary Examiner — Oleg Survillo
Assistant Examiner — Christopher P Cadorna
(74) Attorney, Agent, or Firm — Fenwick & West LLP

(57) ABSTRACT

A social networking system presents a viewing user with a newsfeed of stories describing actions performed by other social networking system users. In particular, the social networking system provides a pre-fetched set of newsfeed stories to a user device of the viewing user and a presentation order for the stories. The social networking system does not "lock" the set of newsfeed stories or the presentation order. The user device locally stores the pre-fetched ranked set of newsfeed stories upon receipt. When the viewing user later requests presentation of newsfeed stories, the user device retrieves the set of newsfeed stories and presents, to the viewing user, stories from the set according to the presentation order. A request is also sent to the social networking system to "lock" the presented newsfeed stories and the order in which the newsfeed stories were presented.

8 Claims, 7 Drawing Sheets

(56) References Cited

U.S. PATENT DOCUMENTS

| | | | |
|---|---|---|---|
| 2013/0031489 A1 | 1/2013 | Gubin et al. | |
| 2013/0054582 A1* | 2/2013 | Macklem | G06F 17/30864 |
| | | | 707/723 |
| 2013/0073632 A1 | 3/2013 | Fedorov et al. | |
| 2013/0246521 A1* | 9/2013 | Schacht | G06Q 50/01 |
| | | | 709/204 |
| 2013/0290469 A1* | 10/2013 | Allen | H04L 67/2847 |
| | | | 709/213 |
| 2014/0306978 A1* | 10/2014 | Du | G06T 1/00 |
| | | | 345/581 |
| 2015/0213484 A1* | 7/2015 | Amara | H04L 67/22 |
| | | | 705/14.45 |

* cited by examiner

PRE-FETCHING NEWSFEED STORIES FROM A SOCIAL NETWORKING SYSTEM FOR PRESENTATION TO A USER

BACKGROUND

This invention relates generally to social networking systems, and in particular to pre-fetching and providing content of a social networking system across multiple user devices.

In recent years, users of social networking systems have shared their interests and engaged with other users of the social networking systems by sharing photos, real-time status updates, and playing social games. The amount of information gathered from users is staggering—information describing a variety of "newsworthy" items, including recent moves to a new city, graduations, births, engagements, marriages, and the like, as well as more mundane content such as status messages, information about what music has been listened to by users, and recent check-in events at coffee shops. As users become more connected with other users and entities on the social networking system, the number of content items provided to the users increases exponentially. Existing social networking systems have ordered content items in reverse chronological order such that newly published content is displayed first. However, as a result of a flood of content items published on social networking systems, users may be exposed to irrelevant and uninteresting content while missing more relevant content that was previously presented.

Social networking systems may rank content items based on user interests and affinities for other users, but providing a continuous and chronological stream of content to users may effectively obscure more interesting and relevant content items among less interesting content items that have been more recently published. Because users may load a page of a social networking system without reading content items provided on the page, interesting and relevant content items may never be seen by the users. As a result of a decline in the user experience, users may become less engaged with the social networking system.

Specifically, users of social networking systems do not have an effective tool to indicate whether content items have been read or otherwise consumed. Providing users with efficient methods of consuming content items on a social networking system is valuable in providing a better user experience for users. As a result of consumption of content items, highly targeted contextual advertising may further provide valuable advertising revenue to the social networking system. However, existing systems have not provided users with tools or methods of managing the consumption of numerous incoming content items. Existing systems also have not solved the problem of reducing latency with respect to presentation of stories while maintaining consistency of presented stories across multiple user devices.

SUMMARY

A social networking system presents a viewing user with a newsfeed of stories describing actions performed by other social networking system users. To reduce latency in providing the newsfeed to the viewing user through a user device, the social networking system provides a pre-fetched ranked set of newsfeed stories to the user device. The user device locally stores the pre-fetched ranked set of newsfeed stories upon receipt. Locally storing the newsfeed stories allows the user device to quickly present the viewing user with newsfeed stories when requested. Over time, additional pre-fetched ranked sets of newsfeed stories may be received and locally stored by the user device. In one embodiment, older pre-fetched sets of newsfeed stories stored by the user device are discarded, overwritten, deleted, or ignored once newer pre-fetched ranked sets of newsfeed stories are received. After the viewing user requests to access the newsfeed of stories, a most recent or current pre-fetched ranked set of newsfeed stories locally stored by the user device is presented to the user via the user device. When the current ranked set of newsfeed stories is presented, the user device sends a request to the social networking system to update a view state of the viewing user such that the current ranked set of stories and the order in which the current ranked set was presented are "locked" with respect to the viewing user. Specifically, the view state of the viewing user identifies newsfeed stories previously presented to the viewing user and the order in which the newsfeed stories were presented. Updating the view state responsive to the request causes the view state to include the presented current ranked set of newsfeed stories and fixes the ordering in which the current ranked set of stories was presented. Thus, if the viewing user subsequently requests newsfeed stories from the social networking system using a different user device, the view state associated with the viewing user is accessed to identify the current ranked set of newsfeed stories previously presented to the viewing user and the order in which the current ranked set of newsfeed stories was presented to the viewing user. The different user device then presents the current ranked set of newsfeed stories according to the order. This allows the social networking system to present newsfeed stories to the viewing user in a consistent manner when multiple user devices are used by the viewing user to access the social networking system.

Figure 1:
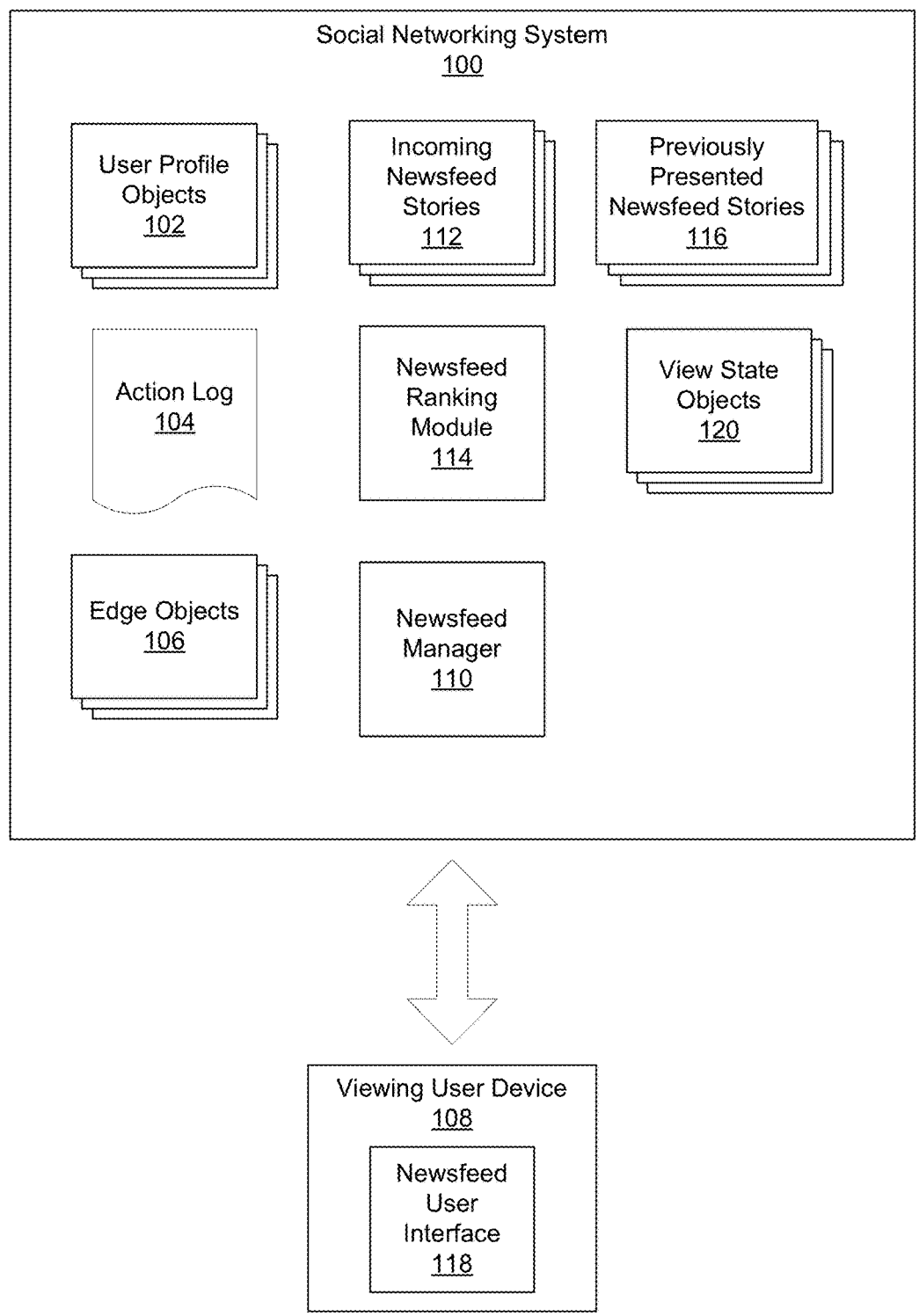
FIG. 1 is high level block diagram illustrating a process of selectively providing content in a social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

A social networking system may also attempt to infer information about its users. A social networking system may analyze posted content by users that include keywords, such as "wedding." Location information may be gathered from content items posted by users to infer a home location of the user. As a result, a social networking system may infer certain profile attributes of a user, such as geographic location, educational institutions attended, and age range, by analyzing the user's connections and their declared profile information. Inferring profile attributes are further discussed in "Inferring User Profile Information," U.S. application Ser. No. 12/916,322, filed on Oct. 29, 2010, which is hereby incorporated by reference.

A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests. In one embodiment, a social networking system may compute affinity scores for users' interests either explicitly expressed or otherwise inferred on the social networking system and use these affinity scores in ranking new content items that will be published in newsfeeds, or communication channels on the social networking system, for the users. Newsfeed rankings based on affinity scores are further discussed in related applications, "Adaptive Ranking of Newsfeed in Social Networks," U.S. application Ser. No. 13/194,770, filed on Jul. 29, 2011 and "Ranking Newsfeed Based on Social Graph Information," U.S. application Ser. No. 13/194,773, filed on Jul. 29, 2011, both which are hereby incorporated by reference.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge. By enabling advertisers to target their advertisements based on user interactions with objects related to a keyword, the advertisements may reach a more receptive audience because the users have already performed an action that is related to the advertisement. For example, a merchandiser that sells Justin Bieber t-shirts, hats, and accessories may target ads for new merchandise to users that have recently performed one of multiple different types of actions, such as listening to Justin Bieber's song "Baby," purchasing Justin Bieber's new fragrance, "Someday," commenting on a fan page for Justin Bieber, and attending an event on a social networking system for the launch of a new Justin Bieber concert tour. Enabling third-party developers to define custom object types and custom action types is further described in a related application, "Structured Objects and Actions on a Social Networking System," U.S. application Ser. No. 13/239,340 filed on Sep. 21, 2011, which is hereby incorporated by reference.

Even though a social networking system may collect, and in some cases infer, information about its users, significant resources must be expended to organize the staggering amounts of data collected. A social networking system having hundreds of millions of users, for example, gathers and infers a staggering amount of information about its users. To address issues of scalability and efficiently expending computing resources, a social networking system provides a snapshot of databases for modules to process. Recent changes in a user's personal life, such as an engagement, birth of a child, moving across the country, graduating from college, and starting a new job, can be collected and inferred from these snapshots on social networking systems. Content items related to these life events may be prioritized in a ranking of newsfeed stories selectively provided to users to ensure that the most relevant information is consumed first, in one embodiment.

As users accumulate more connections on a social networking system, newsfeeds, or the communication channels used by the social networking system to communicate content posted by the users' connections, have the potential to become inundated and clogged with irrelevant information. Ranking content items according to users' interests and affinities for other users may help to mitigate this problem. However, a social networking system may be unable to determine whether users that engage with the social networking system often, even multiple times a day with different devices associated with the same user profile, have finished viewing the content items already provided. Often times, a user may load a web page on the social networking system and inadvertently overlook a particularly engaging content item posted by another user connected to the user. This leads to less user engagement on the social networking system.

Social networking systems strive to keep their users engaged by delivering relevant content as soon as users are able to consume the content. Determining whether users are ready to view more content, especially as users accumulate hundreds and even thousands of "friends" on the social networking system, is valuable to ensuring that users remain engaged with the social networking system without inundating their newsfeeds with irrelevant content. Machine learning and heuristics analysis may be used in selectively providing content to users of a social networking system.

FIG. 1 illustrates a high level block diagram of a process for selectively providing content to users of a social networking system, in one embodiment. The social networking system 100 uses different types of information about users in the process of selectively providing content to users, including user profile objects 102, an action log 104, and edge objects 106. Each user of the social networking system 100 is associated with a specific user profile object 102. These user profile objects 102 include declarative information about the user that was explicitly shared by the user as well as any profile information inferred by the social networking system 100. In one embodiment, a user profile object 102 may include thirty or more different data fields, each data field describing an attribute of the corresponding user of the social networking system 100.

Users of the social networking system 100 may take actions using the social networking system 100 that are associated with one or more objects. Information describing these actions is stored in the action log 104. The action log 104 includes many different types of interactions that occur on a social networking system, including commenting on a photo album, communications between users, becoming a fan of a musician, and adding an event to a calendar. Additionally, the action log 104 records a user's interactions with advertisements on the social networking system 100 as well as other applications operating on the social networking system 100.

Edge objects 106 store information about users' connections to other nodes on a social networking system 100. Such information may include the interactions between the user and the connection on the social networking system 100, including wall posts, comments on photos, geographic places where they have been tagged together, and photos in which they have both been tagged in. In one embodiment, an edge object 106 includes information about the strength of the connection between the users, such as an affinity score. If a user has a high affinity score for a particular connection, the social networking system 100 has recognized that the user interacts highly with that connection. Affinity scores and methods of gathering this social data from a social networking system are described further in "Contextually Relevant Affinity Prediction in a Social Networking System," U.S. application Ser. No. 12/978,265, filed on Dec. 23, 2010, which is hereby incorporated by reference.

A viewing user device 108 may connect with the social networking system 100 and request content in a newsfeed user interface 118. A newsfeed manager 110 responds to the request from the viewing user device 108 by first determining previously presented newsfeed stories 116 for the user associated with the viewing user device 108. Incoming newsfeed stories 112 for the user associated with the viewing user device 108 are determined and then ranked by a newsfeed ranking module 114. The top incoming newsfeed stories 112 may be selected by the newsfeed manager 110 and displayed in the newsfeed above the remaining incoming newsfeed stories 112. The newsfeed ranking module 114 may use information about the user associated with the viewing user device 108 to determine the ranking of content items in the newsfeed for the user. This user information may be obtained from user profile objects 102, edge objects 106, and actions stored in the action log 104 associated with the user.

The newsfeed manager 110 may then provide previously presented newsfeed stories 116 below the incoming newsfeed stories 112 for rendering in the newsfeed user interface 118 based on received user input that indicates the user has finished consuming the previously presented newsfeed stories 116. As a result, the viewing user will see the top new stories first, followed by the remaining new stories, and then the previously presented newsfeed stories. Such user input may include clicking on, or otherwise selecting, a link in the newsfeed user interface 118 for more stories, detecting a scroll action from the viewing user device 108, receiving clicking actions on various content items in newsfeed user interface 118, and an elapsed time spent on the newsfeed user interface 118 after loading the newsfeed user interface 118 on the viewing user device 108.

The newsfeed manager 110 records, for each user on the social networking system 100, a "view state" of the newsfeed stories that have been presented in each user's newsfeed, storing the order of the stories that have been presented. The view state at a particular time may be stored in a view state object 120 associated with the user. Using this view state, the newsfeed manager 110 may determine whether newsfeed stories have evolved, changing the ranking of the newsfeed stories. For example, a viewing user may be connected to another user that shared a link about a news story about Christmas shopping. The viewing user may express interest in this link by sharing the news story with other users connected to the viewing user, commenting on the news story, or "liking" the news story. Later, other users connected to the viewing user may further interact with the news story or may post other stories related to the topic of the news story about Christmas. The newsfeed ranking module 114 may rank the news story higher as a result of users with high affinities interacting with the newsfeed story. Because these interactions have evolved the previously presented news story 116, the news story may be presented to the viewing user as an incoming newsfeed story 112 by the newsfeed manager 110. In addition, the newsfeed manager 110 may cluster the newsfeed stories about Christmas into one newsfeed story, showing the newer interactions by other users.

The newsfeed manager 110 may, in one embodiment, use machine learning methods to selectively provide new content to users of the social networking system 100. Each user on the social networking system 100 may have different affinities for other users on the social networking system 100, interests and concepts embodied as nodes on the social graph of the social networking system 100, and applications that may be installed on the social networking system 100. Content items produced by these users, interests, concepts, and applications have the potential to flood users with irrelevant information, effectively hiding more relevant items. Machine learning may be used to predict which content items are more relevant for users as well as when users may be ready to consume new content items by analyzing user behaviors on the social networking system.

As a viewing user device 108 loads a newsfeed user interface 118, the newsfeed manager 110 may render a link in the newsfeed user interface 118 to indicate a number of new stories that have been accumulated. In this way, the user may read and/or consume top stories that have been posted since the last time the user logged in. In one embodiment, the newsfeed manager 110 may determine that the user associated with the viewing user device 108 is actively engaged with the newsfeed interface 118 and may automatically update the newsfeed user interface 118 with top incoming newsfeed stories 112 as ranked by the newsfeed ranking module 114. In another embodiment, the newsfeed manager 110 may determine that a top incoming newsfeed story 112 warrants automatically updating the newsfeed user interface 118 for the user based on past user behaviors. In a further embodiment, the newsfeed manager 110 may update the link in the newsfeed user interface 118 to indicate an updated number of new stories that have been accumulated and await user input, such as a mouse click, a touchpad input, voice input, gesture input, or keyboard input, to execute the link and display the new incoming newsfeed stories 112. A "click" action may be defined as any user input used to select and execute a link.

In one embodiment, the newsfeed manager 110 may dynamically render the previously presented newsfeed stories 116 and incoming newsfeed stories 112 in a ranking determined by the newsfeed ranking module 114 based on user input received, or lack of receipt, from the newsfeed user interface 118 on the viewing user device 108. For example, a user may access a social networking system 100 through a viewing user device 108 in the morning and browse through content items that are provided in the newsfeed user interface 118. Once provided in the newsfeed user interface 118, the order of the previously presented newsfeed stories 116 is stored as the user's view state at that time in a view state object 120 associated with the viewing user. The user may then browse on other sites on the viewing user device 108 and leave the newsfeed user interface 118 open, where the newsfeed user interface 118 is embodied on a web page loaded by a web browser or on a native application on a mobile device. Later that afternoon, the user may again access the social networking system 100 through the viewing user device 108 to either continue browsing previously presented newsfeed stories 116 or new incoming newsfeed stories 112. As described above, the newsfeed manager 110 may render a link in the newsfeed user interface 118 to indicate that incoming newsfeed stories 112 are available. The user may click on the link to view the new incoming newsfeed stories 112. This user input may cause the newsfeed manager 110 to provide for display in the newsfeed user interface 118 the incoming newsfeed stories 112 as ranked by the newsfeed ranking module 114 above the previously presented newsfeed stories in the order stored in the user's view state that morning retrieved from the view state object 120 associated with the user.

Alternatively, the user may never click on that link to display the incoming newsfeed stories 112. In that case, the newsfeed manager 110 may continue holding the incoming newsfeed stories 112 while refreshing the link that indicates an increasing amount of new stories. On the other hand, the newsfeed manager 110 may automatically refresh the newsfeed user interface 118 to display the incoming newsfeed stories 112 with the previously presented newsfeed stories 116. In one embodiment, the newsfeed ranking module 114 may rank a new incoming newsfeed story 112 below a previously presented newsfeed story 116 because the previously presented newsfeed story 116 may have been highly interacted with by other users connected to the viewing user, may have evolved by the original publishing user commented on the previously presented newsfeed story 116, or may be of high interest to multiple users connected to the viewing user. As a result, the incoming newsfeed stories are selectively provided to the viewing user based on information gathered about that user as well as the view state of the newsfeed for that user.

System Architecture

Figure 2:
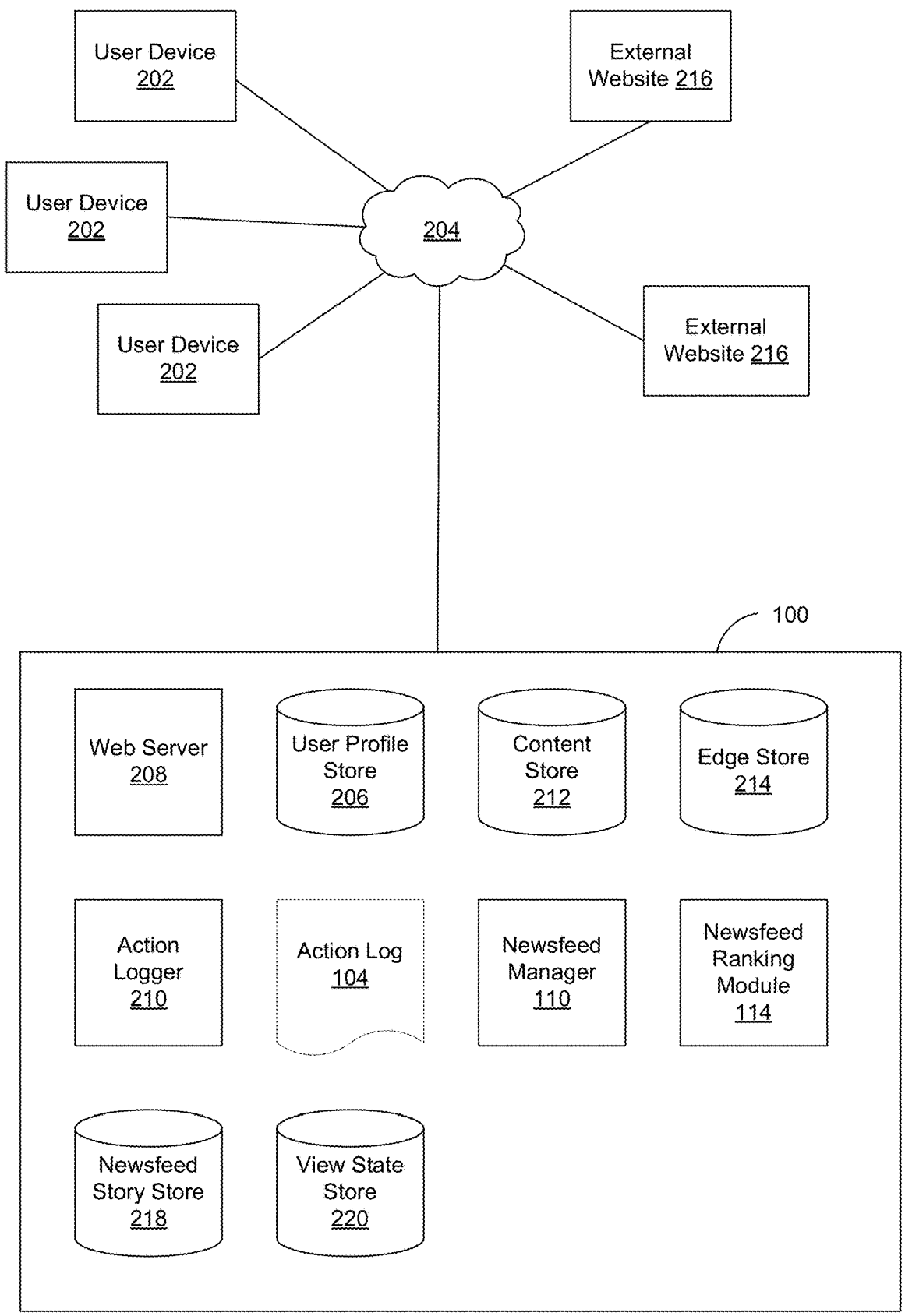
FIG. 2 is a network diagram of a system for selectively providing content in a social networking system, showing a block diagram of the social networking system, in accordance with an embodiment of the invention.

FIG. 2 is a high level block diagram illustrating a system environment suitable for selectively providing content to users of a social networking system, in accordance with an embodiment of the invention. The system environment comprises one or more user devices 202, the social networking system 100, a network 204, and external website 216. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, an action log 104, a content store 212, an edge store 214, a newsfeed manager 110, a newsfeed ranking module 114, a newsfeed story store 218, and a view state store 220. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

The action logger 210 is capable of receiving communications from the web server 208 about user actions on and/or off the social networking system 100. The action logger 210 populates the action log 104 with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. These actions are stored in an action log 104.

An action log 104 may be used by a social networking system 100 to track users' actions on the social networking system 100 as well as external websites that communication information back to the social networking system 100. As mentioned above, users may interact with various objects on the social networking system 100, including commenting on posts, sharing links, and checking-in to physical locations via a mobile device. The action log 104 may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log 104 records data about these users, including viewing histories, advertisements that were clicked on, purchasing activity, and buying patterns.

User account information and other related information for users are stored as user profile objects 108 in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile store 206 also maintains references to the actions stored in an action log and performed on objects in the content store 212.

The edge store 214 stores the information describing connections between users and other objects on the social networking system 100 in edge objects 110. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge store 214 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 214, in one embodiment. For example, a user that plays multiple songs from Lady Gaga's album, "Born This Way," may have multiple edge objects for the songs, but only one edge object for Lady Gaga.

A newsfeed manager 110 selectively provides content to users of a social networking system 100 and records the consumption of content by users using view state objects 120 for the users of the social networking system 100. View state objects 120 are stored in the view state store 220 and are associated with user profile objects 102 stored in the user profile store 206. As new newsfeed stories are generated for a user by the newsfeed manager 110, the newsfeed stories are ranked by the newsfeed ranking module 114 and stored in the newsfeed story store 218. The newsfeed manager 110 may communicate with user devices 202 through the web server 208 and network 204 to provide content to users of the social networking system 100. In one embodiment, a newsfeed manager 110 may provide content through a social plug-in, such as an iFrame, to an external website 216 to provide content posted on the social networking system 100 about an entity associated with the external website 216. As an example, a business entity that creates a page on the social networking system 100 may desire to publish the content items posted on the page's newsfeed in the social networking system to an external website 216 via a social plug-in installed on the external website 216.

Providing Content to Users of a Social Networking System

Figure 3:
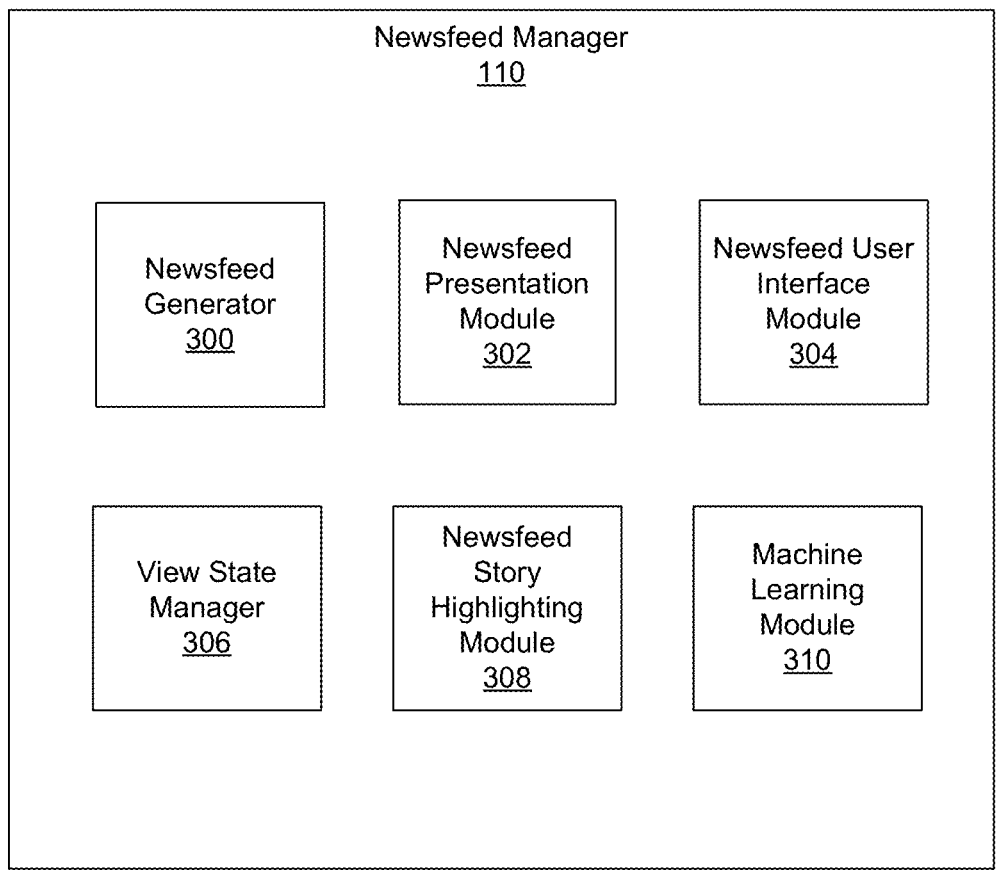
FIG. 3 is high level block diagram illustrating a newsfeed manager that includes various modules for managing content provided to users of a social networking system, in accordance with an embodiment of the invention.

FIG. 3 illustrates a high level block diagram of the newsfeed manager 110 in further detail, in one embodiment. The newsfeed manager 110 provides the functionality for managing activities related to newsfeed including, generating the newsfeed stories, selecting the newsfeed stories for presentation to users of the social networking system 100, retrieving a ranking of the newsfeed stories identified for presentation to a user, and presenting the newsfeed stories via the newsfeed user interface 118. A newsfeed story may describe objects represented in the social networking system, for example, an image, a video, a comment from a user, status messages, external links, content generated by the social networking system, applications, games, or user profile. The newsfeed manager 110 includes a newsfeed generator 300, a newsfeed presentation module 302, a newsfeed user interface module 304, a view state manager 306, a newsfeed story highlighting module 308, and a machine learning module 310. These modules may perform in conjunction with each other or independently to selectively provide content to users of a social networking system 100.

The newsfeed generator 300 module generates newsfeed stories for presentation to users of the social networking system 100. The user to whom a newsfeed story is presented is referred to as a viewer of the newsfeed story. In an embodiment, the newsfeed generator 304 analyzes information stored in the action log 104 to identify information useful for generating newsfeed stories. The newsfeed generator 300 identifies actions stored in action log 104 that are likely to be of interest to viewers and extracts information describing these actions from the action log 104 to generate incoming newsfeed stories 112. Alternatively, the newsfeed generator 300 can obtain information describing actions from other modules, for example, from the action logger 210, or other run time modules that implement functionality for performing different types of actions. For example, if a user uploads an image to the social networking system 100, the module executing the code for uploading the image can inform the newsfeed generator 300 of the action so that the newsfeed generator 300 can generate a newsfeed story describing the action.

The newsfeed generator 300 may determine that certain actions are not likely to be of interest to users for reporting as incoming newsfeed stories 112. For example, a user hiding a comment posted by another user or a user changing certain types of user preferences may not be of interest to other users and is therefore not reported in newsfeed stories. However, other changes made by a user to the user's profile may be considered interesting for other users, for example, a change in relationship status of a user. The newsfeed generator 300 may not generate newsfeed stories based on certain actions as a matter of policies enforced by the social networking system 100. For example, a user viewing user profile of another user or a user sending a private message to another user may not be presented as newsfeed stories due to privacy concerns. Furthermore, the newsfeed generator 300 may consider privacy settings of individual users to determine whether certain actions of a user can be presented as newsfeed stories to other users. A user may set the user's privacy settings to limit the set of people to whom newsfeed stories describing the user's actions may be sent. For example, a user may allow only connections of the user to receive information describing the users' actions, whereas another user may allow connections of the user's connections to receive the information. A user may restrict the types of actions that are reported as newsfeed stories. For example, the user may specify that certain actions, for example, adding a new connection may not be reported as newsfeed stories.

In an embodiment, the newsfeed generator 300 stores generated newsfeed stories in the newsfeed story store 218. The newsfeed story store 218 may be represented as a database that links various objects related to the newsfeed stories. Each newsfeed story stored in the newsfeed story store 218 can be associated with other entities in the social networking system 100. For example, a newsfeed story may be associated with one or more users that performed an action described in the newsfeed story as well as with a representation of the video in the social networking system 100. The users that performed the actions described in the newsfeed story are called the actors. For example, if the newsfeed story describes a comment posted by John on a video posted by Jack, both John and Jack can be considered actors of the newsfeed story. As another example, a newsfeed story describing a comment posted by a user in response to another user's wall post may be associated with both the user who posted the message on the wall and the user who posted the comment.

A newsfeed presentation module 302 provides generated content items, or newsfeed stories, for display on newsfeed user interfaces 118 on viewing user devices 108. The newsfeed presentation module 302 determines the newsfeed stories to be presented to a user and provides the stories selected for presentation to the newsfeed user interface module 304. The newsfeed user interface module 304 presents the selected newsfeed stories to the newsfeed user interface 118 on a viewing user device 108. The newsfeed presentation module 302 determines a set of stories for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. The newsfeed presentation module 302 uses the newsfeed ranking module 114 to rank the newsfeed stories being presented to the user.

The newsfeed presentation module 302 may present a subset of the stories based on the rank, for example, the top 10 stories, depending on the display area available on the newsfeed user interface 118 for presenting the stories. The newsfeed presentation module 302 presents the stories in the order determined by the ranking, for example, stories ranked higher may be presented more prominently compared to stories ranked lower. In an embodiment, the stories ranked higher are presented above the stories ranked lower. In a further embodiment, the remaining incoming stories not selected as the "top" stories may be presented in a chronological order after the top stories. In other embodiments, stories ranked higher may be presented more prominently by displaying them using an appropriate text color, font, text size, back ground color, etc.

A view state manager 306 operates independently and asynchronously from the other modules in the newsfeed manager 110. The view state manager 306 determines when to capture a view state of the newsfeed for each user of a social networking system 100. A viewing user may login to a social networking system 100 to start a new viewing session. Throughout the session, incoming newsfeed stories 112 may be provided to a viewing user, and as a result, the view state for the viewing user has changed. The view state manager 306 may determine that, after each newsfeed story is published to or presented over a user's newsfeed, the view state should be updated in the view state object 120. The view state object 120 is stored in a view state store 220 which may be embodied in super fast memory, in one embodiment. In one embodiment, the view state is updated when a user's session expires. The session may expire based on a lack of engagement with or activity on the social networking system 100 by the user. For example, a user may open a web browser on a user device 202 to connect to the social networking system 100. After browsing newsfeed stories, the user may open another browser window to view other web pages not connected to the social networking system 100. In one embodiment, the session created when the user first connected with the social networking system 100 will expire based on a predetermined time period of non-activity elapsing. In another embodiment, the viewing session expires when the user logs out of the social networking system 100. When a session expires, the view state, which includes an order of newsfeed stories and indications of whether newsfeed stories were featured or highlighted as a top story, is stored in the view state object 120 associated with the user.

Using the view state manager 306, the newsfeed manager 110 may determine that the user is not yet ready to read or consume more newsfeed stories. For example, if a user starts a new session but does not scroll down the newsfeed, as detected by the newsfeed user interface module 304, then the newsfeed manager 110 may assume that the user has not yet read the newsfeed stories provided on the newsfeed user interface. If that user later starts another session, the previously presented newsfeed stories 116 remain frozen on the newsfeed user interface using the view state previously stored by the view state manager 306. A link may be rendered by the newsfeed user interface module 304 to indicate that incoming newsfeed stories 112, generated by the newsfeed generator 300 and ranked by the newsfeed ranking module 114, are available for consumption without presenting the new incoming newsfeed stories 112. In one embodiment, the link includes a number of incoming newsfeed stories 112 that are available. This number may be dynamically updated in real-time as new newsfeed stories are generated by the newsfeed generator 300. In another embodiment, the newsfeed user interface module 304 may include a preview of the new incoming newsfeed stories 112 that are available for consumption without publishing the incoming newsfeed stories 112 and changing the view state.

In a further embodiment, the newsfeed manager 110 may infer that a user has finished consuming or reading the newsfeed stories that are presented upon loading the newsfeed user interface on a user device 202. In that case, the incoming newsfeed stories 112 may be automatically rendered and presented by the newsfeed presentation module 302 upon creation by the newsfeed generator 300 and ranking by the newsfeed ranking module 114. The view state would also be updated by the view state manager 306. In yet another embodiment, the newsfeed manager 110 may hold the incoming newsfeed stories 112 behind a link rendered by the newsfeed user interface module 304 unless or until a top story has been generated by the newsfeed generator 300 and ranked by the newsfeed ranking module 114. The top new news story may have a prediction score, determined by the newsfeed ranking module 114, that exceeds a predetermined threshold to cause the newsfeed manager 110 to publish the top news story without determining that the viewing user is ready to consume more stories.

A newsfeed story highlighting module 308 selects newsfeed stories that have been highlighted by the newsfeed ranking module 114 as highly relevant stories for a viewing user. Highlighted stories may be displayed in a newsfeed more prominently above other newsfeed stories and may also be rendered in a different color or background to denote that the stories have been highlighted. The newsfeed story highlighting module 308 may also, in one embodiment, combine newsfeed stories that are about the same topic or refer to the same link. For example, the newsfeed story highlighting module 308 may analyze keywords that are included in content items that posted on the social networking system 100, such as "Christmas," and combine those newsfeed stories into a condensed newsfeed story that is highlighted for the viewing user to see on their newsfeed. This enables the viewing user to browse through a newsfeed more efficiently by combining redundant and similar posts. In another embodiment, a separate newsfeed process groups these redundant and similar posts into a single combined post and operates in conjunction with the newsfeed story highlighting module 308 to highlight the combined post on the newsfeed.

In one embodiment, the newsfeed story highlighting module 308 may include programmable logic, or instructions, to ensure that a newsfeed story that was posted by another user or entity connected to the viewing user is highlighted, based on the affinity score for that user. For example, if a viewing user is highly interested in newsfeed stories posted by another user on the social networking system 100, such as the viewing user's wife, based on user profile information, interactions with that user, as well as content posted by that user, then the newsfeed story highlighting module 308 may be configured to highlight all newsfeed stories published by that user. In one embodiment, a viewing user may interact with the newsfeed user interface to indicate that a newsfeed story should be highlighted. In doing so, the newsfeed story highlighting module 308 may better understand what types of newsfeed stories appeal to the viewing user. Similarly, the viewing user may indicate that a highlighted story should not be highlighted by interacting with the newsfeed user interface.

In another embodiment, the newsfeed story highlighting module 308 may generate a prediction model for each user on the social networking system 100 to predict which newsfeed stories should be highlighted based on a number of factors, including the authoring user of the newsfeed story, the topic of the newsfeed story, the type of content included in the newsfeed story, applications that have published the newsfeed story, reputation metrics of users that have published the newsfeed story, and a virality metric of the newsfeed story. A prediction model may, over time, adjust weights for these factors depending on user interactions that differ from user to user. Machine learning methods may be used to optimize the prediction models to be specific to each viewing user, in one embodiment. In this way, viewing users with differing affinities for different types of content items may have more personalized newsfeeds.

A machine learning module 310 may be used in the newsfeed manager 110 to refine the predictive models and select the predictive factors used for selecting highlighted newsfeed stories. In one embodiment, a social networking system 100 uses a machine learning algorithm to analyze user interactions with highlighted stories to retrain the predictive model. Using feedback from the user interactions indicating whether a newsfeed story should be highlighted, the predictive model may be refined to include more or less predictive factors and the weights assigned to each predictive factor, or coefficients, can also be adjusted based upon the response, i.e., the user interactions with the highlighted stories.

In another embodiment, the machine learning module 310 may be used to determine whether a previously presented newsfeed story, such as a shared link to a video, may evolve into a new incoming newsfeed story based on other users sharing the link, commenting on the link, or otherwise interacting with the link. For example, if a very close friend of a viewing user, as determined from an affinity score for the user profile object for the very close friend, shared the link that was previously presented on the viewing user's newsfeed, the previously presented newsfeed story may be combined into a single newsfeed story that includes the other users that have shared the link, including the very close friend and his comments about the link, if any. The machine learning module 310 may be used to determine, in conjunction with the newsfeed story highlighting module 308, whether such stories should evolve and be presented to the viewing user again.

Figure 4A:
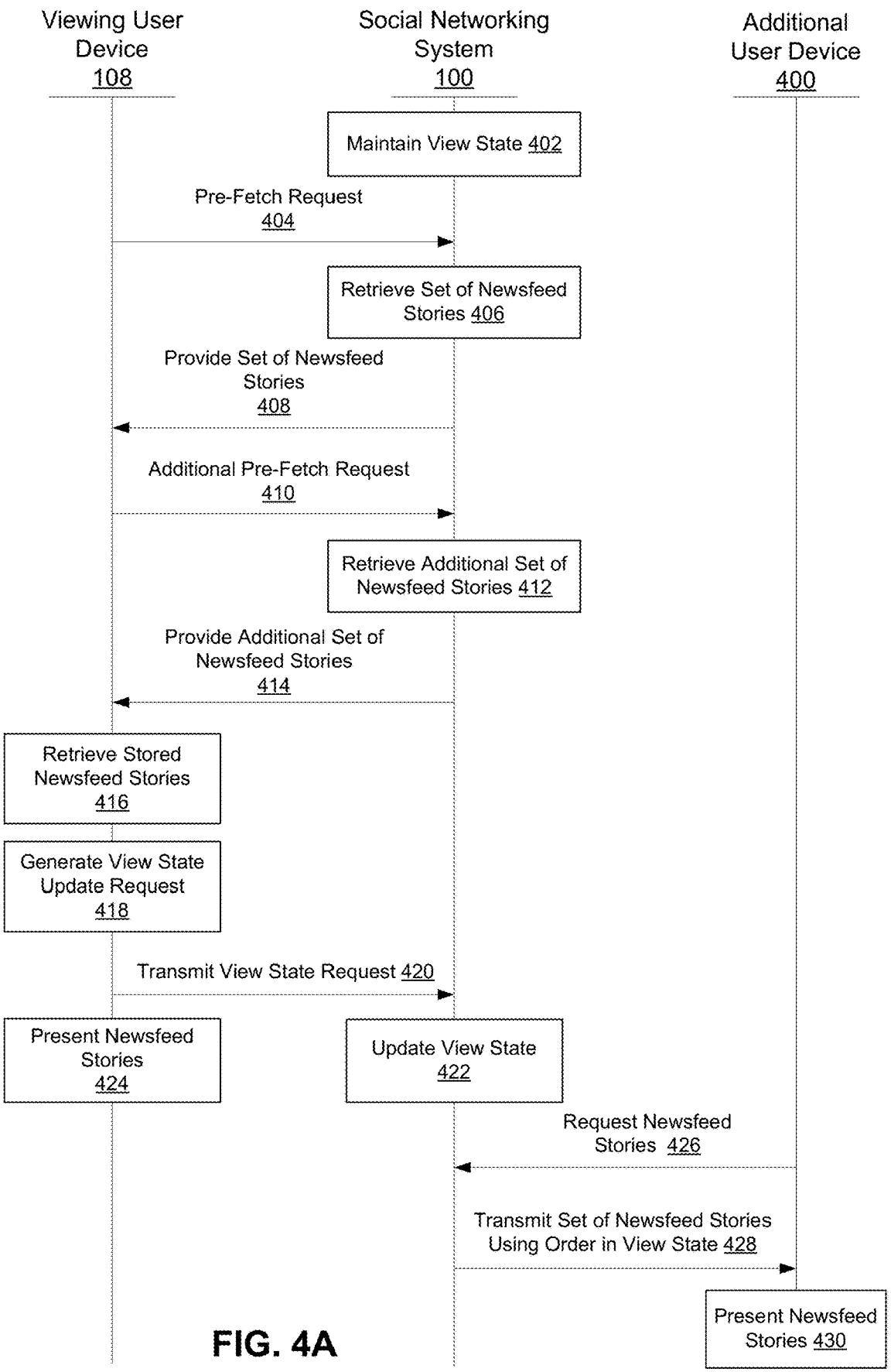
FIG. 4A is an interaction diagram of a process of pre-fetching and consistently providing content to a viewing user of a social networking system across multiple user devices, in accordance with an embodiment of the invention.

FIG. 4A illustrates an interaction diagram of one embodiment of a process for pre-fetching content for presentation to a viewing user of the social networking system 100. The social networking system 100 maintains 402 a view state for the viewing user that identifies newsfeed stories that have been or will be presented to the viewing user over a period of time (e.g., 30 days, 7 days, 1 hour, etc.). Additionally, the view state indicates the ordering in which the newsfeed stories were presented to the viewing user. In one embodiment, the view state may be stored in a view state object 120 associated with a user profile object 102 of the viewing user.

In the embodiment shown by FIG. 4A, the viewing user accesses the social networking system 100 through a viewing user device 108. The viewing user device 108 transmits 404 a pre-fetch request for one or more newsfeed stories to the social networking system 100, where the pre-fetch request identifies the viewing user. The pre-fetch request may be generated by a native application or some other process associated with the social networking system 100 and operating on the viewing user device 108. In one embodiment, the viewing user device 108 (e.g., via a native application associated with the social networking system 100) transmits 404 the pre-fetch request responsive to a triggering event indicating that the viewing user is likely to request viewing of newsfeed stories from the social networking system 100. Examples of a triggering event include: powering on (i.e., turning on) the viewing user device 108, activating the viewing user device 108 from a low power mode (e.g., a sleep or hibernation mode), positioning the viewing user device 108 in a certain orientation, positioning the viewing user device 108 within a threshold distance of the viewing user's face, performing one or more specified functions on the viewing user device 108 (e.g., executing certain software applications, drafting an email, receiving a text message, unlocking the viewing user device 108 from a locked state, etc.), pushing a button, etc.

When the social networking system 100 receives the pre-fetch request, the social networking system 100 retrieves 406 a set of newsfeed stories for the viewing user. For example, the social networking system 100 may retrieve a set including three newsfeed stories: A, B, and C. In one aspect, the set of newsfeed stories includes newsfeed stories selected by the social networking system 100 for the viewing user. For example, at least one of the pre-fetched newsfeed stories describes an action performed by an additional user that is connected to the viewing user via the social networking system 100. The action described by the newsfeed story may be performed through the social networking system 100 or external to the social networking system 100. As a specific example, a newsfeed story may indicate that a user connected to the viewing user is currently at a particular location or is interacting with a content item (e.g., listening to a particular song, reading a particular content item, expressing a preference for a comment, etc.).

The set of newsfeed stories may be retrieved 406 in any suitable manner. For example, the social networking system 100 may periodically generate new newsfeed stories and hold them in a queue to be presented to the viewing user, and the set of newsfeed stories are retrieved from the queue in one embodiment. In another embodiment, the set of newsfeed stories is generated when the pre-fetch request is received by the social networking system 100. In certain embodiments, the social networking system 100 only includes newsfeed stories in the set that have at least a threshold prediction or quality score for the viewing user.

In one embodiment, the social networking system 100 retrieves 406 newsfeed stories that occurred after the viewing user was previously presented with newsfeed stories. For example, the viewing user device 108 presented newsfeed stories to the viewing user during a viewing session that occurred at time $t_0$. When the social networking system 100 receives a pre-fetch request at time $t_1$, which is after time $t_0$, the social networking system 100 retrieves 406 newsfeed stories that occurred (e.g., have a time stamp) after the time $t_0$.

After retrieving 406 the set of newsfeed stories, the social networking system 100 provides 408 the set of newsfeed stories to the viewing user device 108. The social networking system 100 additionally provides ranking information with the set of newsfeed stories. For example, ranking scores associated with each newsfeed story in the set are provided to allow the viewing user device 108 to determine an order in which to present the newsfeed stories in the set. Illustratively, the ranking information may be usable to determine that a set of newsfeed stories including the newsfeed stories A, B, and C is to be presented in that order. Ranking information for a newsfeed story in the set may be based on, for example, the affinity of the viewing user to an additional user described in the newsfeed story, the time the newsfeed story occurred, the subject or topic of the newsfeed story, the number of positive user interactions associated with the newsfeed story (e.g., "likes" or "shares"), or any other suitable criteria. For example, a ranking score for a particular newsfeed story may be relatively high if the viewing user and an additional user have had a relatively large number of interactions over the social networking system 100. In one embodiment, the provided set of newsfeed stories are not yet included or "fixed" in the maintained view state of the viewing user. As will be discussed, newsfeed stories are not "fixed" in the maintained view state until an indication is received that the newsfeed stories have been or will be presented to the viewing user.

In one embodiment, over time, the viewing user device 108 periodically transmits additional pre-fetch requests for newsfeed stories to the social networking system 100. For example, as shown in FIG. 4A, an additional pre-fetch request may be sent 410. When the social networking system 100 receives an additional pre-fetch request, the social networking system 100 retrieves 412 and provides 414 to the viewing user device 108 an additional set of newsfeed stories and corresponding ranking information. In one embodiment, the additional set of newsfeed stories includes one or more newsfeed stories associated with time stamps that occur after a time when a prior set of newsfeed stories was sent to the viewing user device 108 responsive to a prior pre-fetch request. The additional set of pre-fetched newsfeed stories may also include one or more newsfeed stories included in previously provided sets of newsfeed stories. The additional set of pre-fetched newsfeed stories may further exclude one or more newsfeed stories included in previously provided sets of newsfeed stories.

As a specific example, the social networking system 100 may have previously provided, in response to an initial pre-fetch request, a first pre-fetched set of newsfeed stories that includes the newsfeed stories A, B, and C. At a later time, the social networking system 100 may receive a subsequent pre-fetch request. The subsequent pre-fetch request may be received prior to the first pre-fetched set of newsfeed stories being presented to the viewing user over the viewing user device 108. Such may be the case because the viewing user may not have requested to view newsfeed stories. After receiving the subsequent pre-fetch request, the social networking system 100 retrieves a second set of newsfeed stories. In retrieving the second set of newsfeed stories, the social networking system 100 may determine that the newsfeed story B includes spam-like characteristics based on various user interactions with the newsfeed story B over the social networking system 100. The social networking system 100 may additionally identify a new, high quality newsfeed story D and a lesser quality newsfeed story E. Thus, the social networking system 100 includes the newsfeed stories A, C, D, and E in the second set of pre-fetched newsfeed stories. The second set of pre-fetched newsfeed stories also excludes the newsfeed story B since it has been determined to have spam-like characteristics. As will be apparent based on the additional disclosure below, because the story B is not included in the second set of pre-fetched newsfeed stories and was not previously presented, the story B may not be eventually presented to the viewing user in the future.

In some instances, the ranking information for different sets of pre-fetched newsfeed stories retrieved in response to different pre-fetch requests may vary. Hence, the orderings of stories included in the different sets may also vary. Illustratively, the set of newsfeed stories retrieved 406 may include an ordering of: A, B, and C. The additional set of newsfeed stories retrieved 412 may include a different ordering: D, C, A, and E. In one embodiment, the orderings of stories across different sets may vary due to changes in information available to the social networking system 100 and related to the stories and/or the viewing user. For example, the orderings of stories across different sets may vary because a quality score for a story from the sets has changed, an affinity between the viewing user and a user described in a story from the sets has changed, etc.

In one embodiment, the viewing user device 108 locally stores (i.e., caches) any received pre-fetched sets of newsfeed stories and ranking information retrieved from the social networking system 100. For example, the viewing user device 108 stores any sets of newsfeed stories and corresponding ranking information in a local storage device (e.g., a hard drive, RAM, etc.) of the viewing user device 108. Locally storing a set of newsfeed stories allows the viewing user device 108 to more quickly present newsfeed stories to the viewing user when requested. In one embodiment, the most recently received set of newsfeed stories is marked or otherwise indicated as the "current" set of newsfeed stories. In some embodiments, when the viewing user device 108 receives a more recent pre-fetched set of newsfeed stories, the viewing user device 108 discards, overwrites, ignores, or deletes previously stored pre-fetched sets of newsfeed stories and corresponding ranking information that have not yet been presented to the viewing user. Thus, any newsfeed stories included in previously stored sets and not included in the current set may not be eventually presented to the viewing user. For example, a previously received and stored set may include the newsfeed stories A, B, and C. A more recently received set of newsfeed stories may include the newsfeed stories D, A, C, and E. Since the social networking system 100 discards, overwrites, ignores, or deletes the previously received and stored set following receipt of the more recently received set, the newsfeed story B may not be eventually presented to the viewing user.

In some embodiments, while using the viewing user device 108, the viewing user requests to view newsfeed stories from the social networking system 100. For example, the viewing user may request to view newsfeed stories by initiating execution of or bringing to an operating foreground, an application associated with the social networking system 100 (e.g., a native application associated with the social networking system 100). When the viewing user device 108 receives the request from the viewing user to view newsfeed stories, the viewing user device 108 retrieves 416 the set of newsfeed stories locally stored by the viewing user device 108. For example, the viewing user device 108 retrieves 416 the most recently received, or "current," set of newsfeed stories. An ordering for the retrieved set of pre-fetched newsfeed stories may be determined based on the ranking information corresponding to newsfeed stories in the retrieved set.

Additionally, the viewing user device 108 generates 418 a view state update request to "fix" or "lock" the ordering of the newsfeed stories in the retrieved set in the view state maintained by the social networking system 100. The view state indicates newsfeed stories from the retrieved set that will be or were presented to the viewing user and may also specify the order in which the newsfeed stories will be or were presented to the viewing user. In one embodiment, the view state update request identifies the viewing user and includes unique identifiers for newsfeed stories in the retrieved set. Additionally, the view state update request may include the determined ordering associated with the newsfeed stories in the retrieved set. For example, the view state update request includes a number associated with each newsfeed story identifier indicating the position of a newsfeed story corresponding to the newsfeed story identifier in the determined ordering.

The viewing user device 108 transmits 420 the view state update request to the social networking system 100, which updates 422 the view state associated with the viewing user to identify newsfeed stories identified by the view state update request. Additionally, the social networking system 100 updates the view state associated with the viewing user to specify the ordering of the newsfeed stories within the set of newsfeed stories indicated by the viewing request. The updated view state is stored in the view state object 120 associated with the user profile object 102 for the viewing user.

Updating the view state allows the social networking system 100 to "fix" or "lock" the ordering of the newsfeed stories within the retrieved set indicated by the view state update request. This allows the social networking system to maintain the ordering of newsfeed stories in the retrieved set relative to one another, so that they may be presented in the same order to the viewing user by multiple user devices. Further, the social networking system 100 enables the ordering of the retrieved set relative to other sets of newsfeed stories presented to the viewing user to also be maintained across multiple user devices, allowing the viewing user to access the social networking system 100 from different user devices and be presented with stories in the same ordering.

For example, an initial set of newsfeed stories is presented to the viewing user by the viewing user device 108 at a time $t_0$, so the social networking system 100 updates 422 the view state associated with the viewing user to indicate the initial set, as well as the order in which stories in the initial set of newsfeed stories were presented. Subsequently, an additional set of newsfeed stories is presented to the viewing user by the viewing user device 108 at a time $t_1$. Thus, the social networking system updates 422 the view state for the viewing user to indicate that the additional set of newsfeed stories was presented to the viewing user. The view state may also be updated to indicate the order in which the initial set of newsfeed stories and the additional set of newsfeed stories were presented to the user. Specifically, the view state may indicate that the additional set was presented after the initial set.

In one embodiment, the social networking system 100 identifies additional newsfeed stories to provide to the viewing user device 108 when the view state update request is received. The additional newsfeed stories may include newsfeed stories associated with times occurring after times associated with newsfeed stories in the set of newsfeed stories indicated by the view state update request. After identifying additional newsfeed stories, the social networking system 100 may communicate the additional newsfeed stories to the viewing user device 108 for presentation to the viewing user. Identification and provision of the additional newsfeed stories is further described below in conjunction with FIG. 4B.

As shown in FIG. 4A, the viewing user device 108 presents 424 newsfeed stories in the retrieved set to the viewing user according to the determined ordering. For example, the viewing user device 108 displays 424 newsfeed stories from the retrieved set according to the determined ordering using a display device of the viewing user device 108 or generates audio reciting newsfeed stories in the retrieved set according to the determined ordering via speakers of the viewing user device 108. Additionally, the viewing user device 108 may present additional newsfeed stories received from the social networking system 100 along with the newsfeed stories from the retrieved set.

In one embodiment, because the newsfeed stories are retrieved from the current set of newsfeed stories, any newsfeed stories included in previously provided sets and not included in the current set are not presented to the user or fixed in the view state for the viewing user. For example, the set of newsfeed stories provided 408 may have included a newsfeed story B. The set of newsfeed stories provided 414 may not include the newsfeed story B. Thus, the viewing user device 108 does not present the newsfeed story B to the user. Likewise, the newsfeed story B is not included in the maintained view state for the viewing user.

At a later time, an additional user device 400 of the viewing user and separate from the viewing user device 108 requests 426 newsfeed stories. When the social networking system 100 receives the request from the additional user device 400, the social networking system 100 accesses the view state associated with the viewing user to identify the newsfeed stories to be provided to the additional user device 400 and the order in which to present the newsfeed stories via the additional user device 400. In the example shown by FIG. 4A, the social networking system 100 identifies the newsfeed stories from the set of newsfeed stories previously indicated by the view state update request transmitted 420 by the viewing user device 108. Following identification, the social networking system 100 retrieves the newsfeed stories in the set. Additionally, from the view state, the social networking system 100 determines the order in which the newsfeed stories in the set were presented to the viewing user by the viewing user device 108.

The social networking system 100 transmits 428 the newsfeed stories and ordering information for the stories to the additional user device 400, which presents 430 the received newsfeed stories based on the ordering information. Hence, the additional user device 400 presents 430 the newsfeed stories in the same order in which they were presented to the viewing user by the viewing user device 108. This allows the social networking system 100 to present newsfeed stories to the viewing user 108 in a consistent ordering across multiple user devices, allowing the viewing user 108 to more easily identify news stories when using different user devices to access the social networking system 100.

Figure 4B:
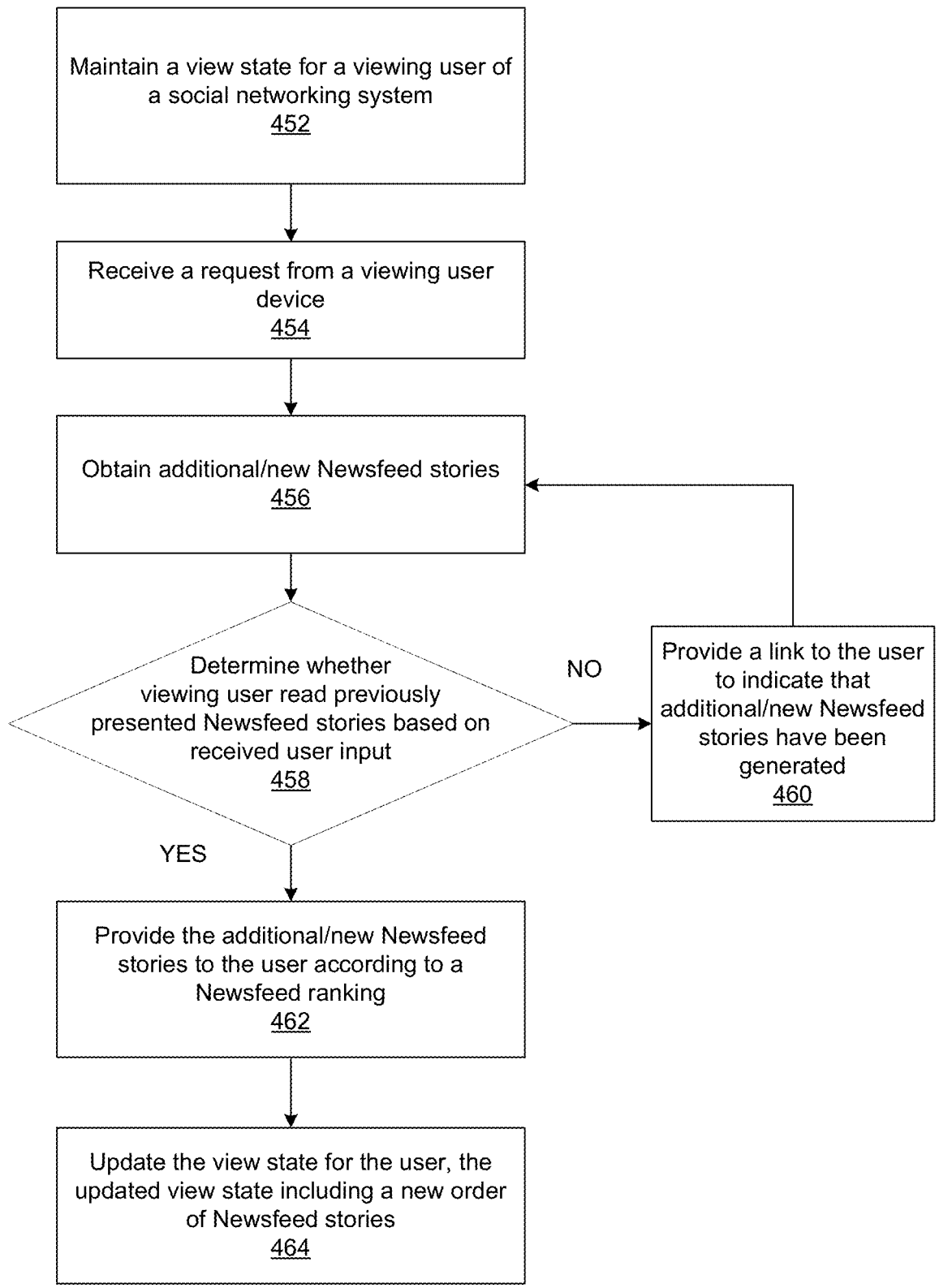
FIG. 4B is a flowchart of a process of selectively providing content to a viewing user of a social networking system, in accordance with another embodiment of the invention.

FIG. 4B illustrates a flow chart diagram depicting a process of selectively providing content to a viewing user of a social networking system, in accordance with an embodiment of the invention. A view state is maintained 452 indicating newsfeed stories previously presented to a viewing user. A request may be received 454 from the viewing user device 108 of the viewing user. The request may be, for example, a view state update request or a request for newsfeed stories. This request may be received 454 in the form of an application programming interface (API) call from a mobile device application executed by the viewing user device 108, in one embodiment. In another embodiment, the request may be received 454 as a web page request from a web browser operating on the viewing user device 108.

Once the request has been received 454, additional/new newsfeed stories are obtained 456. For example, the newsfeed generator 300 in the newsfeed manager 110 may generate additional newsfeed stories and hold them in a queue. The additional newsfeed stories may be obtained from this queue, in one embodiment. In another embodiment, additional newsfeed stories may be dynamically generated upon receiving 454 the request. In a further embodiment, a newsfeed ranking module 114 may identify a top newsfeed story. As a result, the top newsfeed story is obtained 456 as an additional newsfeed story. This additional newsfeed story may, in one embodiment, include a plurality of newsfeed stories that have been combined into a single newsfeed story. Remaining additional newsfeed stories, other than the selected top newsfeed stories, are also obtained 456.

After additional newsfeed stories are obtained 456, the social networking system 100 determines 458 whether the viewing user has read the previously presented newsfeed stories indicated by the view state. Such a determination can be performed based on received user input. If the social networking system 100 determines 458 that the viewing user has not read the presented newsfeed stories based on received user input, then a link is provided 460 to the viewing user to indicate that additional newsfeed stories have been generated and additional newsfeed stories are continuously obtained 456. User input that may indicate whether the viewing user has read the presented newsfeed stories includes a scroll action on a web browser or mobile application, a click action on a link provided in a newsfeed story, and a refresh of the user interface on the web browser or mobile application. In one embodiment, no user input is needed, and if the web browser is active or the mobile application is open, the social networking system 100 may determine 458 that the viewing user has read the presented newsfeed stories. In another embodiment, the social networking system 100 determines 458 that the viewing user has read the presented newsfeed stories based on a predetermined time period elapsing.

After the social networking system 100 has determined 458 that the viewing user has read the previously presented newsfeed stories, the additional newsfeed stories are provided 462 to the viewing user according to a newsfeed ranking. The additional newsfeed stories are ranked by the newsfeed ranking module 114 and may be highlighted by the newsfeed story highlighting module 358 in the newsfeed manager 110. In one embodiment, the additional newsfeed stories are provided 462 to the viewing user according to a prediction model generated by the newsfeed story highlighting module 308 based on previous user interactions on the social networking system 100. In another embodiment, the newsfeed ranking may change dynamically, based on newly generated newsfeed stories. In a further embodiment, the top new newsfeed stories are provided in ranked order, followed by the remaining additional newsfeed stories in a chronological order, such as reverse chronological order.

After the additional newsfeed stories are presented 462 to the viewing user, the view state for the viewing user is updated 464, such that the updated view state includes a new order of the newsfeed stories provided to the viewing user. The updated view state is stored in the view state object 120 associated with the user profile object 102 for the viewing user. The view state is used by the social networking system 100 to determine 458 whether the viewing user has been presented with newsfeed stories, in one embodiment.

Figure 5A:
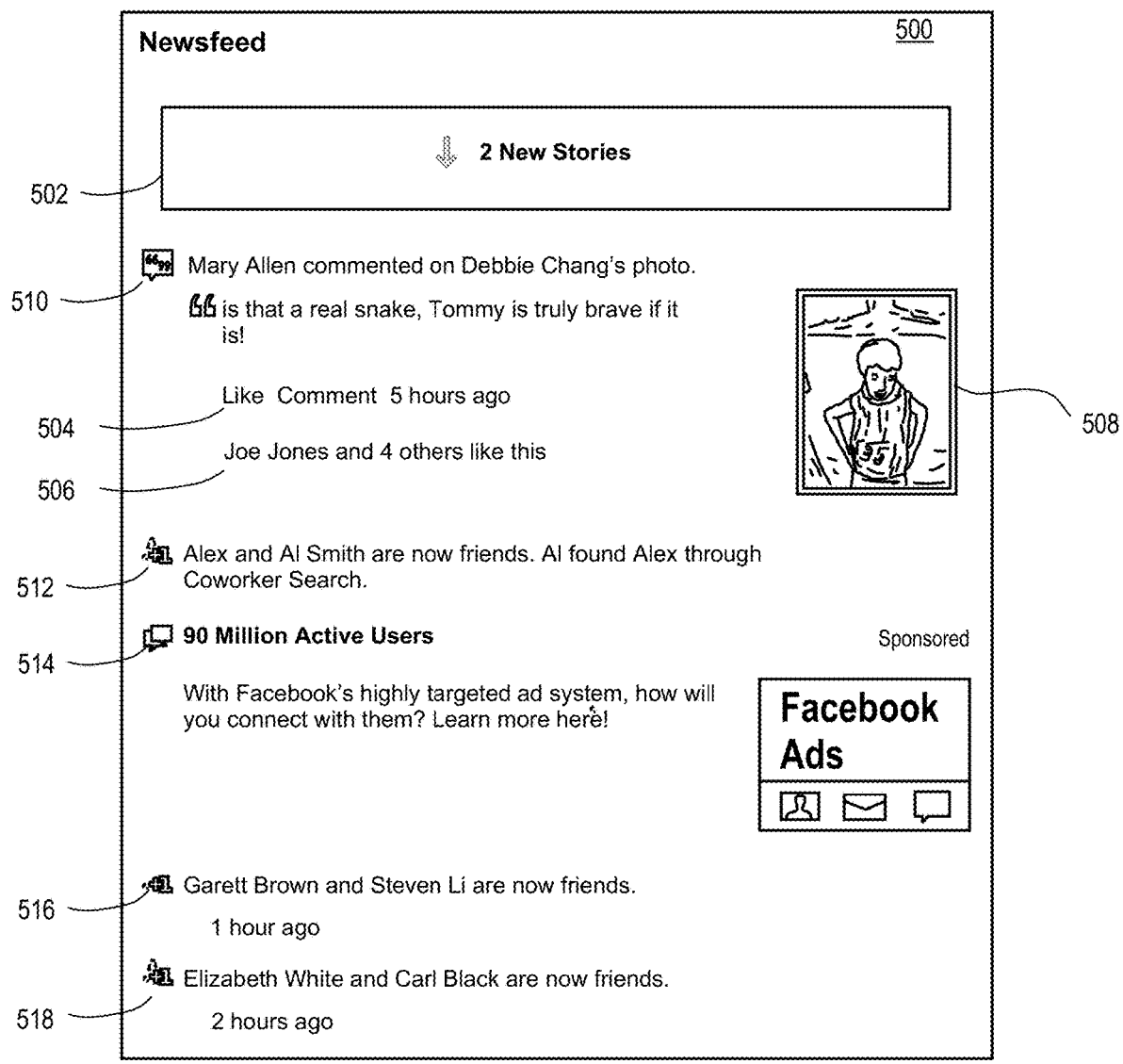
FIGS. 5A and 5B are examples of a user interface of a process of selectively providing content to a viewing user of a social networking system, in accordance with an embodiment of the invention.
Figure 5B:

FIGS. 5A and 5B are examples of a user interface of a process of providing content to a viewing user of a social networking system, in accordance with an embodiment of the invention. In FIG. 5A, the user interface provides a newsfeed 500 to a viewing user of the social networking system. The newsfeed 500 includes a plurality of newsfeed stories, including a newsfeed story 510 about Mary Allen commenting on Debbie Chang's photo 508, a newsfeed story 512 indicating a new connection was formed between users Alex and Al Smith, an advertisement 514, a newsfeed story 516 indicating a new connection was formed between users Garrett Brown and Steven Li, and a newsfeed story 518 indicating a new connection was formed between users Elizabeth White and Carl Black. The newsfeed story 510 includes links 504 for the viewing user to interact with the newsfeed story 510, including expressing approval of the newsfeed story 510 by "liking" it and commenting on the newsfeed story 510. The newsfeed story 510 also includes a social indicator 506 of other users that expressed interest in the newsfeed story 510.

The newsfeed 500 illustrated in FIG. 5A also includes an incoming newsfeed stories link 502 that indicates to the viewing user that there are additional newsfeed stories that are ready to be presented. As shown in FIG. 5A, there are "2 New Stories" available to be presented to the viewing user as described in the incoming newsfeed stories link 502. Over time, as more new incoming newsfeed stories are generated by the newsfeed generator 300, the number of new stories available in the incoming newsfeed stories link 502 will increase. In one embodiment, the new incoming newsfeed stories will not be presented to the viewing user until the viewing user clicks on the incoming newsfeed stories link 502. In another embodiment, the new incoming newsfeed stories are presented to the viewing user after a predetermined time period elapses. In yet another embodiment, the new incoming newsfeed stories are presented to the viewing user if there is a highly relevant newsfeed story, as determined by the newsfeed story highlighting module 308 in the newsfeed manager 110. In a further embodiment, new incoming newsfeed stories are presented to the viewing user without the incoming newsfeed stories link 502 being rendered. In that embodiment, new incoming newsfeed stories are presented to the viewing user upon generation.

In FIG. 5B, the user interface includes a newsfeed 500 that includes the new incoming newsfeed stories. In one embodiment, the viewing user has click on the incoming newsfeed stories link 502 illustrated in FIG. 5A, resulting in the presentation for display in the newsfeed 500 of a newsfeed story 520 about a link to a video on an external website shared by user Michael Roberts and 34 other users connected to the viewing user and a newsfeed story 528 indicating a new connection was formed between users Mary Joseph and Peter Carol. The newsfeed story 520 includes a time indicator 522 of when the link was first shared with the viewing user, 10 hours ago. The newsfeed story 520 also includes a recent comment on the link by another user of the social networking system that further includes a time indicator of when the comment was made, 45 minutes ago. Finally, the newsfeed story 520 includes a grouping link 526 that indicates information about other users connected to the viewing user that have also shared the link. Upon clicking the grouping link 526, the comments of the other users are presented in the newsfeed 500 within the newsfeed story 520.

The newsfeed story 528 also includes a time indicator 530 of when the new connection was formed, 1 hour ago. As illustrated in FIG. 5B, the newsfeed story 520 that comprises a combined post of multiple posts sharing the same link was first shared with the viewing user 10 hours ago, and yet the newsfeed story 520 is presented above the newsfeed story 528 which was completed an hour ago. In one embodiment, the newsfeed story highlighting module 308 may have placed the newsfeed story 520 about the shared link to an external video above the newsfeed story 528 about the formation of a new connection between other users of the social networking system because of the type of content included in the newsfeed story 520. The viewing user may be more interested in viewing shared links to external videos. In another embodiment, the newsfeed story highlighting module 308 may have placed the newsfeed story 520 about the shared link to an external video above the newsfeed story 528 because of the user Franc Williams's comment 524 on the shared link that was completed only 45 minutes ago. Because of the new comment from user Franc Williams, the newsfeed story 520 may have evolved into a new incoming newsfeed story as determined by the newsfeed story highlighting module 308. In yet another embodiment, if the viewing user did not have a preference of the content type of the newsfeed story 520 about the shared link to an external video, then the recent comment 524 from user Franc Williams made the newsfeed story 520 more relevant to the viewing user than the later formation of a connection between other users of the social networking system 100.

The new incoming newsfeed stories 520 and 528 appear above the previously presented newsfeed stories 510 and 512 within the newsfeed 500. In one embodiment, the incoming newsfeed stories 520 and 528 are dynamically rendered in the newsfeed 500 upon the viewing user clicking on the link 502 as illustrated in FIG. 5A. In another embodiment, the incoming newsfeed stories 520 and 528 are automatically rendered in the newsfeed 500 upon generation by the newsfeed generator 300 in the newsfeed manager 110. In yet another embodiment, the incoming newsfeed stories 520 and 528 may be presented to the viewing user in the newsfeed 500 even if the viewing user does not click on the link 502 because the newsfeed manager 110 determines that the incoming newsfeed stories 520 and 528 are of such relevance that the viewing user would want to view the incoming newsfeed stories 520 and 528. In a further embodiment, the incoming newsfeed stories 520 and 528 are dynamically rendered in the newsfeed 500 because the newsfeed manager 110 detects that the viewing user is actively engaged with the user interface that includes the newsfeed 500, such as detecting a scroll action, a click action on links within the newsfeed 500, or an active browser window or mobile application. In an alternative embodiment, the incoming newsfeed stories 520 and 528 are dynamically rendered in the newsfeed 500 upon the lapse of a predetermined time period.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   receiving, by a social networking system, a pre-fetch request for stories for a viewing user from a first user device;
   responsive to the pre-fetch request, retrieving a first set of newsfeed stories describing actions of additional users of the social networking system;
   determining a ranked order of newsfeed stories in the first set of newsfeed stories, the ranked order representing an order that the newsfeed stories are to be presented;
   providing the first set of newsfeed stories in the determined ranked order to the first user device as a first newsfeed;
   receiving, by the social networking system, a view state of the first set of newsfeed stories from the first user device in response to the set of newsfeed stories being presented on the first user device according to the ranked order, the view state comprising:
   an identifier of the viewing user,
   the first set of newsfeed stories previously provided to the first user device according to the ranked order, and
   an indication of whether the viewing user viewed each newsfeed story in the set of newsfeed stories, wherein the viewing user did not view at least one newsfeed story in the set of newsfeed stories;
   responsive to receiving a second pre-fetch request from a second user device associated with the viewing user, retrieving a second set of newsfeed stories describing a set of new actions of additional users of the social networking system, the second set of newsfeed stories including the at least one newsfeed story from the first set of newsfeed stories that the viewing user did not view in the first newsfeed;
   determining a ranked order of newsfeed stories in the second set of newsfeed stories;
   providing the second set of newsfeed stories in the determined ranked order to the second user device as a second newsfeed, the second set of newsfeed stories being provided above the first set of newsfeed stories viewed by the viewing user; and
   receiving, from the second user device, an updated view state for the viewing user of the social networking system based on the second newsfeed, the updated view state valid for a period of time.

2. The computer implemented method of claim 1, wherein the first set of newsfeed stories provided to the first user device is stored in a local storage of the first user device.

3. The computer implemented method of claim 1, wherein the pre-fetch request is received after detection of a triggering event associated with the first user device.

4. The computer implemented method of claim 1, wherein generating the updated view state for the viewing user comprises:
   adding the second set of newsfeed stories identified in the view state to a plurality of newsfeed stories that were previously presented to the viewing user.

5. The computer implemented method of claim 1, wherein determining the ranked order of newsfeed stories in the first set of newsfeed stories comprises:
   determining affinities between the viewing user and additional users described by newsfeed stories in the first set of newsfeed stories; and
   generating ranking information for the newsfeed stories in the first set of newsfeed stories based at least in part on the affinities.

6. The computer implemented method of claim 1, wherein determining the ranked order of newsfeed stories in the first set of newsfeed stories comprises:
- determining a number of interactions by one or more users of the social networking system with a newsfeed story from the first set of newsfeed stories; and
- generating ranking information for the newsfeed stories in the first set of newsfeed stories based at least in part on the determined number of interactions.

7. The computer implemented method of claim 1, wherein determining the ranked order of newsfeed stories in the first set of newsfeed stories comprises:
- determining time stamps associated with the newsfeed stories in the first set of newsfeed stories; and
- generating ranking information for the newsfeed stories in the first set of newsfeed stories based at least in part on the time stamps associated with the newsfeed stories in the first set of newsfeed stories.

8. The computer-implemented method of claim 1, further comprising:
- receiving a subsequent pre-fetch request for newsfeed stories for the viewing user from the first user device;
- retrieving an additional set of newsfeed stories describing actions of additional users of the social networking system responsive to the subsequent pre-fetch request, the additional set of newsfeed stories including at least one newsfeed story associated with a time stamp subsequent to time stamps associated with the newsfeed stories in the provided second set of newsfeed stories;
- determining an order for presenting the additional newsfeed stories in the additional set of newsfeed stories; and
- providing the additional set of newsfeed stories and the order for presenting the additional newsfeed stories in the additional set of newsfeed stories to the first user device.

\* \* \* \* \*